(12) United States Patent
Oliszewski et al.

(10) Patent No.: US 8,693,029 B1
(45) Date of Patent: Apr. 8, 2014

(54) SYSTEMS AND METHODS FOR THE RELIABLE TRANSMISSION OF FACSIMILES OVER PACKET NETWORKS

(76) Inventors: Michael Oliszewski, Sherwood, OR (US); Kerry A. Krieske, Tigard, OR (US); Jon N. Peck, Sherwood, OR (US)

( * ) Notice: Subject to any disclaimer, the term of this patent is extended or adjusted under 35 U.S.C. 154(b) by 986 days.

(21) Appl. No.: 12/708,090

(22) Filed: Feb. 18, 2010

Related U.S. Application Data

(60) Provisional application No. 61/153,645, filed on Feb. 19, 2009.

(51) Int. Cl.
*G06F 3/12* (2006.01)
(52) U.S. Cl.
USPC .......................................... 358/1.15; 709/205
(58) Field of Classification Search
USPC .......................................... 358/1.15; 709/205
See application file for complete search history.

(56) References Cited

U.S. PATENT DOCUMENTS

| | | | |
|---|---|---|---|
| 6,028,915 A * | 2/2000 | McNevin | 379/49 |
| 8,130,425 B2 * | 3/2012 | Jackson | 358/476 |
| 2004/0146050 A1 * | 7/2004 | Burrell et al. | 370/352 |

FOREIGN PATENT DOCUMENTS

JP 2003338913 * 1/2003

* cited by examiner

*Primary Examiner* — Quynh Nguyen
(74) *Attorney, Agent, or Firm* — J. Curtis Edmondson; Law Offices of J. Curtis Edmondson

(57) ABSTRACT

A method to efficiently and reliably guarantee delivery of fax documents not residing on the internet being transported through the internet to a non-internet fax receiving device through intelligent algorithms to support both ready reception and non-ready reception devices. The algorithms work in conjunction with one another to determine the necessary support to successfully transmit fax data from non-internet to non-internet devices via the transport internet mechanism. The method also supports internet originating fax delivery to non-internet receiving devices through use of the same algorithms in determining the support for both ready reception and non-ready reception devices. The method supports phone number validation prior to the fax being transmitted to it targeted destination. The security of the call and transported data is supported by internet security protocols using HTTPS, and security designed algorithms that work in conjunction within this implementation method. Implementation methods fully support all of the FCC E911 emergency regulations that require all user dial tone access points to be fully capable of providing 911 emergency calling capabilities to route to the nearest appropriate Public Safety Answering Point (PSAP).

2 Claims, 5 Drawing Sheets

SYSTEMS AND METHODS FOR THE RELIABLE TRANSMISSION OF FACSIMILES OVER PACKET NETWORKS

RELATED APPLICATIONS

This application claims the benefit of U.S. Provisional Application No. 61/153,645, filed Feb. 19, 2009, the contents herein incorporated into this application by reference.

BACKGROUND

1. Technical Field

This invention relates to computer and facsimile transmissions, specifically a method to efficiently and reliably guarantee transmission and receipt of faxes documents from non-internet devices routed through internet connectivity based upon extrinsic circumstances: asynchronously, synchronously, pre-call phone number validation.

2. Background

The terms "facsimile" and "fax" shall be used interchangeably and refer to data that is transmitted on the protocol generically known as "T.30".

The term "telephonic" and "telephony" shall generally be considered to be the transmission of audio signals on a PSTN ("Packet Switched Telephony Network") according to generally accepted protocols.

The term "ATA" shall mean analog telephone adapter, which shall generally mean a device that interfaces a traditional telephone handset with a TCP/IP interface.

The term "T.30" shall generally mean a protocol for the transmission of facsimile documents that conform to the "Group-2" or "Group-3" protocol.

The term "HTTP" shall generally mean Hypertext Transfer Protocol (HTTP) which is an application layer protocol for distributed, collaborative, hypermedia information systems.

The term "SIP" shall mean the Session Initiation Protocol which is a signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams.

The term "ITU G.729" is an ITU (International Telecommunications Union, www.itu.int) standard codec. It offers toll quality speech at a reasonably low bit rate of 8 Kbps. However, it is a rather "costly" codec in terms of CPU processing time, therefore some VoIP phones and adapters (notably the Linksys/Sipura/Cisco brands) can only handle one G.729 call (channel) at a time.

The term "PSTN" shall mean a public switched telephone network (PSTN) is the network of the world's public circuit-switched telephone networks.

The term "Media Gateway"

The communication of two telephonic devices and the ability to deliver large amount of fax data first existed in the PSTN environment where voice calls were the main consumer and fax or data communication minor consumers.

Through the use of the PSTN environment all of the same rules and regulations apply that are required for a voice call. The most notable requirement is the use of the fax machine handset to call 911 for emergency support. This 911 Act was sanctioned by the Wireless Communications and Public Safety Act of 1999 to improve public safety and facilitate prompt deployment of emergency services. The faxing mechanism is being carried on the transport mechanism of a voice phone call with tones (sounds) being converted and unconverted to data bits (1s and 0s) to transmit the fax "image" from one location to another location.

The fax protocol T.30 (the ITU standard governing how fax devices function) is the standard for the large amount of fax data communication that has an origination or destination in the PSTN environment. Inherent to the PSTN environment is the reliance and dependency on fixed latency which enables small amounts of delays or retransmission periods to continue with a reliable and accurate fax data representation on the receiving device. The process of transmitting and receiving continuous data is necessary for successful operation of processing fax data from the sender to the receiver without significant interruptions. The fax protocol T.30 has structured in it small amounts of data resend and retry period mechanisms to allow for minor interruption recovery procedural operations. This has been a very successful industry with the support, ability and accessibility to transmit and receive fax documents to be a standard operating procedure for most every business and most individuals from their homes. The ability to transmit and receive legal documents via "faxing" has been established and accepted by the world for all forms of communication and agreements. This compliance and legal document acceptance has established a set of usable expectations worldwide with this everyday use of faxing.

There is a drawback to this model of operation. The receiving fax device may or may not be able to accept the call, or even process the data if the call is accepted. This causes the user to wait and decide the next course of action. The waiting to send the fax data again is not an operation that the user wants to do. The user wants to type a phone number, fax the document and receive some form of acknowledgement of the fax transaction. An error that is commonly encountered is mistyped phone numbers. The users of the fax sending device inputs an incorrect data number causing the submission to fail without any connection being made to the target receiving fax device. Today, IP technology is widespread with the foundation and formation of the internet, intranet and world wide web (www). This highly flexible, redundant failure fallback packet switching concept has laid the ground work for the network that is in common use by all. The current implemented and accepted fax protocols used in the IP technology network: RTP, Real-time Transport Protocol (the IETF standard defined in RFC 3550); T.37 (the ITU standard governing store and forward faxing); T.38 (the ITU standard governing real-time faxing over IP networks).

The general IP traffic and bursts of IP traffic causes delay and even failure scenarios routinely with fax data transmissions. A study has demonstrated that a T1 data circuit can handle well over 40 simultaneous voice calls using today's codec's, the triple redundant packets and G.711 based call initiation phase of T.38 limits the safe number of calls to around 20. This completely reverses the cost benefits of moving to Fax data traffic in to a VoIP system, and in many cases pushes the customer over the top requiring them to purchase considerably more expensive circuits and adds more layers of indirection and complexity to their solution to include FoIP at significantly lower access numbers.

The issue with incorrect phone numbers is magnified when dealing with the IP network. There are longer delays and a higher risk of other negative impacts to the route that the packets must travel to reach the predestined receiving fax device. The originating transmitting fax device has had to either delay the data being sent (Phase D) through inserted delays and stalling mechanisms or blindly starts transmitting the large amount of fax data prior to confirmation of the destination fax device being ready and even capable of receiving the fax data transaction. Rather than error the call and cause the user to resend, the user expects the fax to be retried and sent successfully with little or no interaction required. The preference of the sender is that the fax data gets sent and notification is received after the successful transmission has completed.

Even through all of the technological advancements and various forms of moving large amounts of data, the physical process of transmitting large amounts of legal data continues to be with the use of "scan and send" fax devices. Even with the variations of sending faxes without the physical fax machine, every company still has and maintains fax machines for regular use by their employees, customers, and vendors. Even with the increased use of email, ftp, web postings, and other data accessible points the preferred legal means of transmitting large amounts of data via fax remains in high use throughout the world for many years to come.

The configuration of these media networking communication systems requires much information and configuration to obtain optimal operation and functionality by each of the individual components and on the larger system as a whole entity. This continues to be an urgent issue due to the speed and number of changes that are increasingly developed, disseminated, and implemented by all of the various vendors involved with these complex media networking systems. The integration, stability and reliability is routine in question due to the vast number of networking components involved and the amount of effort and time really necessary to prove full interoperability is successful without any degradation of the networking systems.

The "scan and send" of large amounts of data through fax devices remains a vital part of day to day operations for many businesses. The merging of this faxing data stream on to the IP network is happening through various avenues, but each mechanism has left unresolved issues for the fax users to deal with. The compliance of faxes transmitted on the IP network needs to be addressed for legality, security and status accounting purposes. The mass number of independent component vendors for the media networking communication systems causes a real problem with co-functionality and co-existing, along with the tuning of such systems for reliable, safe, secure, and the most efficient operational settings for the network system.

PRIOR ART REFERENCES

T.30: Procedures for document facsimile transmission in the general switched telephone network, http://www.itu.int/rec/T-REC-T.30/ incorporated herein by reference.
T.37: Procedures for the transfer of facsimile data via store-and-forward on the Internet, http://www.itu.int/rec/T-REC-T.37/en incorporated herein by reference
T.38: Procedures for real-time Group 3 facsimile communication over IP networks, http://www.itu.int/rec/T-REC-T.38/en incorporated herein by reference
FCC 911 Services incorporated herein by reference

SUMMARY

The present inventive subject matter overcomes problems in the prior art by providing a:
These and other embodiments are described in more detail in the following detailed descriptions and the figures.
The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Figure 1:
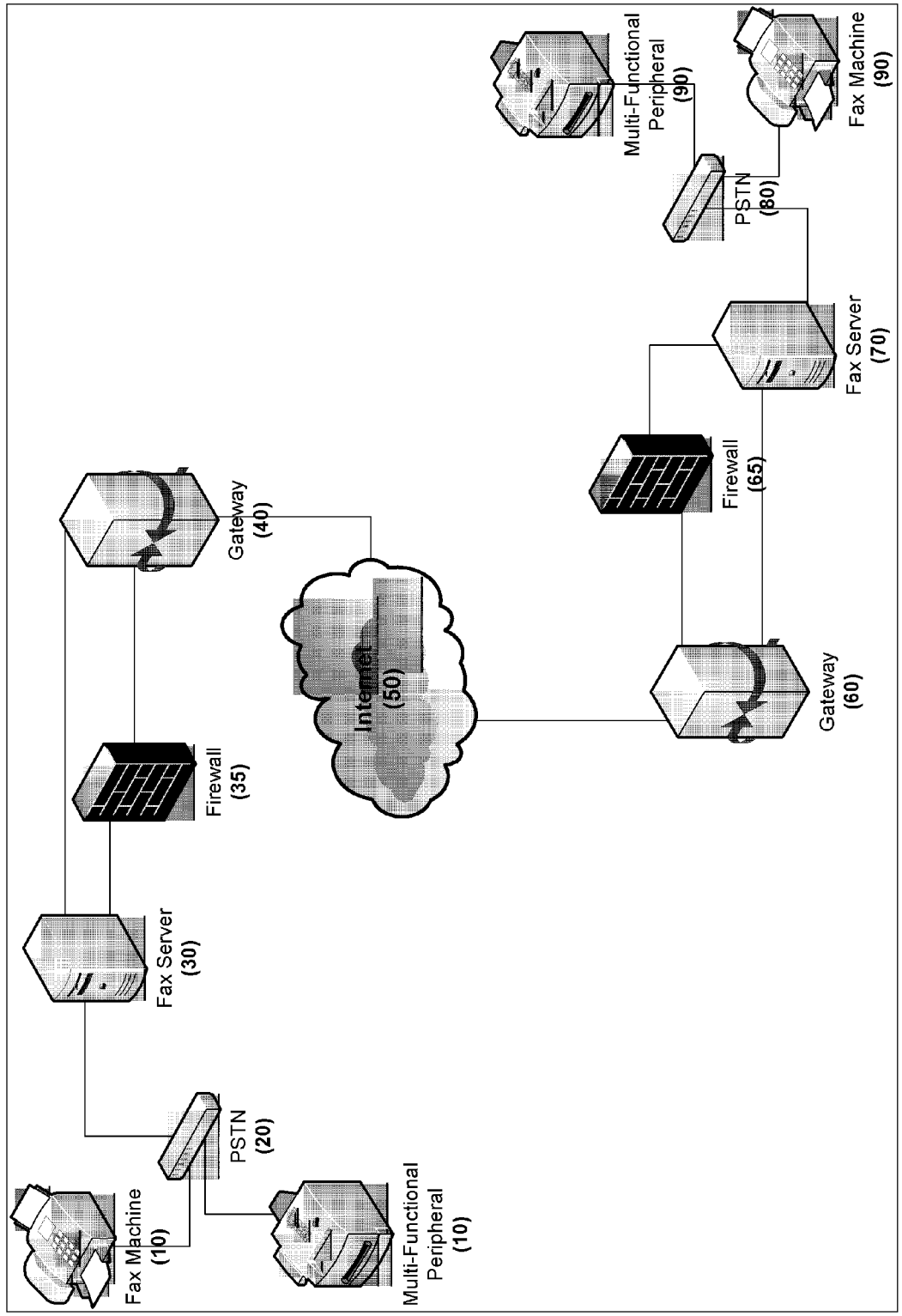
FIG. 1 shows a high-level basic diagram of a typical switched based system connected to a packet based system with fax devices on both ends of the switched network systems

Representative embodiments according to the inventive subject matter are shown in FIGS. 1-5, wherein similar features share common reference numerals.
Single Call (No Audio Mode)
  1) Fax Machine streams fax image to ATA using T.30
  2) ATA streams fax image to fax server via HTTP(s)
  3) Fax server streams fax image to media gateway via SIP, . . . .
  4) Media Gateway steams fax image to PSTN via T.30
Two Call (Full Audio Support Mode)—SIP G.729 Audio
  1) Fax Machine streams audio to ATA
  2) ATA streams audio to Media Gateway via SIP (G.711/G.729-RTP).
  3) Media Gateway streams bi-directional audio to PSTN
  4) Media Gateway or ATA detects fax tones from audio stream.
  5) ATA switches to Fax mode=T.38 REINVITE
  6) Fax Machines streams fax image to ATA via T.30.
  7) ATA Streams fax image to Fax Server via HTTP(s).
  8) Fax Server buffers image data.
  9) Fax Server initiates second call via Media Gateway using SIP-G.711/G.729 RTP
  10) Fax Server streams fax image to Media Gateway via SIP-G.711/T.38.
  11) Media Gateway streams fax image to PSTN via T.30.
  12) Fax Server notifies ATA of result
  13) ATA prints notification to Fax Machine.
Two Call (Full Audio Support Mode)—HTTP(s) Audio
  1) Fax Machine streams audio to ATA
  2) ATA streams bi-directional audio to Fax Server via HTTP(s)
  3) Fax Server streams audio to Media Gateway via SIP-G.711/G.729 RTP
  4) Media Gateway streams bi-directional audio to PSTN
  5) Media Gateway or ATA detects fax tones from audio stream.
  6) ATA switches to Fax mode=T.38 REINVITE
  7) Fax Machines streams fax image to ATA via T.30.
  8) ATA Streams fax image to Fax Server via HTTP(s).
  9) Fax Server buffers image data.
  10) Fax Server initiates second call via Media Gateway using SIP-G.711/G.729 RTP
  11) Fax Server streams fax image to Media Gateway via SIP-G.711/T.38.
  12) Media Gateway streams fax image to PSTN via T.30.
  13) Fax Server notifies ATA of result
  14) ATA prints notification to Fax Machine.

The embedded implementation has two main components of the invention. First, the processing modules for the ATA device will include a T.30 driver stack. This T.30 driver stack will enable fully compliant T.30 communication support with the attached fax device used for transmitting the fax data. The communication will be in complete compliance with all of the standards of T.30, security requirements, and user familiar operations. Every Group 3 fax device that meets the communication standards of transmitting fax through use of T.30 will be fully compatible. As with Group 3 fax devices, all "high speed" modulations will be supported, that includes V.17 (14.4 kbps, 12.0 kbps, 9.6 kbps and 7.2 kbps), V.29 (9.6 kbps and 7.2 kbps) and V.27ter (4.8 kbps and 2.4 kbps). In the same manner, any and all file formats (i.e., standard, fine, super fine, color faxes, JBIG) that are supported by both the sending and receiving fax devices will be fully supported with the ATA device. The implementation is highly flexible for complete backward compatibility and potential future compatibility support. This invention will not have a finite "shelf life" per se.

The usual T.30 compliant call sequences will occur: 1) call set-up to initiate connection between the transmitting and receiving devices; 2) pre-message procedure to discover capabilities for determining/negotiate the call session parameters; 3) fax data transmission and retransmission to guarantee successful representation of fax transmitted; 4) post-message procedures confirming status of fax transmission; 5) call released with an asynchronous termination. The combination of the ATA device and the embedded components provide the foundation for supporting all fax calling devices supporting T.30. Regardless of new "faxing" devices that support additional features as long as T.30 is the fax mode of communication this invention and all of its specialized algorithms will fully function.

Specialized algorithms for one aspect of the invention enables transmitting from any T.30 compliant fax device through the inclusion of the invention ATA device attached to the internet to a fax server connected to the receiving fax device through a phone call on the switch based network (PSTN). The ATA device contains the algorithms and processes to support both fax calls and 911 emergency calls. There is the basic mode of operation which includes full functional support for live time faxing and another mode that includes phone number validation. The live time faxing will perform the end-to-end fax transmission as users are familiar with it today, but using a different median and some highly advance invention algorithm techniques. The phone number validation faxing is the mode of operation that first performs phone number verification on the recipient fax number prior to transmitting the fax. The ATA device contains the algorithms and processes to initiate G.711/G.729 messages to a targeted sending gateway to initiate the phone number call for verification that it is a valid phone number for receiving a fax. The call being verified as a valid phone number will be disconnected; the return status message will be processed by the ATA device containing highly intelligent algorithms to properly react to the status so the faxing can be initiated. With the phone number being successfully validated the fax data will be transmitted to the fax server for sending to the phone number originally called through the special G.711/G.729 messages to the gateway. Upon completion of the faxing with this validate phone number the messages confirming success will be received and processed at both the fax server and ATA device.

The ATA device with the specialized inventive algorithms will properly connect and maintain the call if the 911 number has been entered as the phone number to call. The ATA device algorithms will not disconnect the call as with the phone number validation fax mode of operation would normally perform. This high priority override emergency algorithm will take precedence over all other modes of operation that the ATA device can function in. The call will be highly controlled and protected against system inhibiting factors as much as the ATA device system has security access to do. The call will not end until either the caller or the called party disconnects from the call by hanging up.

Specialized algorithms for another aspect of the invention enables transmitting from any T.30 compliant fax device through the implementation of the invention ATT device through the internet to a receiving fax device through a phone call on the switch based network (PSTN) synchronized. There will be two specialized modules enabled to support the full synchronicity of this operational mode. The ATA device will have the controlling or "master" capability over the other module enabled. The Fax Server will have the second specialized module enable to provide the necessary support and information of the fax call with an instantaneous update time period. The modules on both devices will contain unique identifying information to communicate directly with information about the fax call itself. The information contained about the fax call will allow monitoring, recording and controlling of every aspect of the call. Specific information on the communication timing will be critical to the success of this mode of implementation. Since faxing is a highly time sensitive activity the ability to delay, hold, and resend messages/data is critical in timing and sequence. The ATA device will contain algorithms to support this timing requirement in the most appropriate manner on a per call basis.

Reiterating the fact that the ATA device in this synchronized mode of operation will still activate the specialized inventive algorithms to properly connect and maintain the call if the 911 numbers has been entered as the phone to call. The ATA device algorithms will not disconnect the call. This high priority override emergency algorithm will take precedence over all of the functions that the ATA device can function in. The call will be highly controlled and protected against system inhibiting factors as much as the ATA device system has security access to.

The recap of the invention is the implementation of highly specialized algorithms to support the fax processing from a local non-PSTN connected fax device attached through the ATA device routed through the network to a Fax Server which makes the appropriate phone number connection to the PSTN fax device. The various modes of operation of the ATA device and initiation of additional modules provide the user capabilities of transmitting a fax asynchronously or synchronously through a Fax Server and with or without phone number validation. The invented algorithms will be configurable to select the appropriate mode of operation from call to call. All of this implemented algorithm functionality is overridden, if there is an emergency call dialed with 911 as the phone number. This emergency number takes priority over all functionality without exception.

As shown in FIG. 1, the basic schematic demonstrating the connectivity of the Fax device (10), through a switch based network (PSTN) (20), directly connected to a originating Fax Server (30), routed through a Firewall (35), directly connected to the Gateway (40) to route through the IP network (50) connected to another Gateway (60) with Firewall (65), connected directly to destination Fax Server (70), connected to a switched based network (PSTN) (80), connect to the receiving Fax device (90).

The flow of fax data through FIG. 1 is as follows: Transmitting Fax Device (10) send scanned data thru switched based network (PSTN) (20), Fax Server (30) converts analog/digital signals to packets representing signal in preparation to transmit, Originating Gateway (40) routes packets through IP Network (50) to Destination Gateway (60), through Firewall (65), through Fax Server (70) that depacketizes the data converting all of it to analog/digital signals to be sent through switched based network (PSTN) (80), Receiving Fax Device (90) assembles all of the fax data transmitted. The origination of the fax call requires a message to be sent through the connections of Fax device (10), switch based network (PSTN) (20), Fax Server (30), Gateway (40), IP network (50), Gateway (60), Fax Server (70), switch based network (PSTN) (80), Fax device (90) and back just to acknowledge and confirm that the receiving Fax Device (90) is available to accept the call and to receive the fax data transmission. In essence, each attempt of sending and receiving a fax there is a "go" or "no go" that happens at the start of the process execution. There are no exceptions to this status.

There are many failure points throughout this IP related system implementation. The issues of loss packets, lack of bandwidth availability, reordered packets, packet bursts, bad packets, and other IP-related degradations are all factors that impact the successful handling of packets between the Fax Server (30), Gateway (40), IP network (50), Gateway (60), Fax Server (70). Each of the system components provides various recovery mechanisms or redundancy mechanisms in an attempt to avoid these failure points or scenarios, but it generally only reduces the occurrence number.

Figure 2:
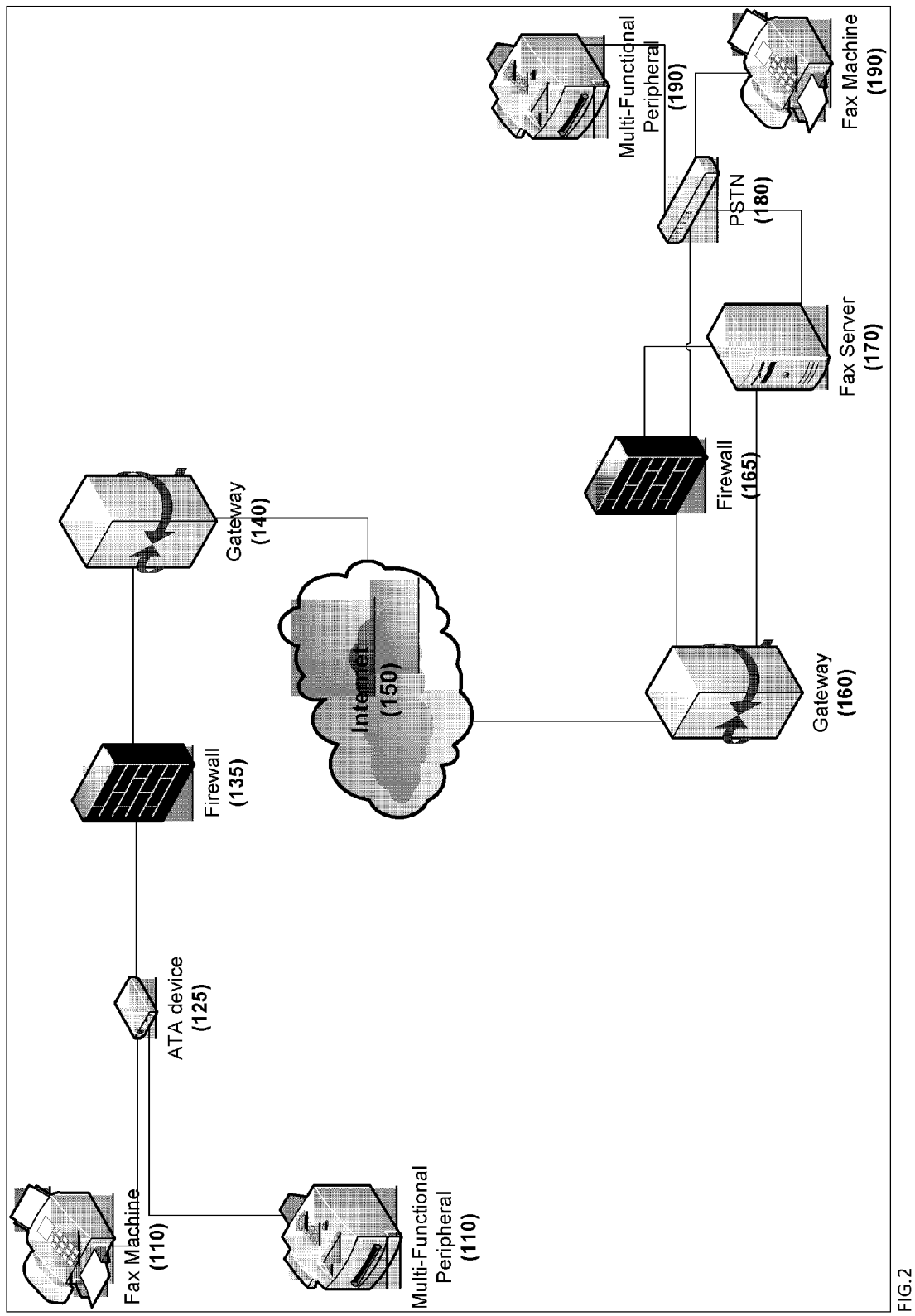
FIG. 2 shows a high-level basic diagram of the fax networking system with the invention inserted
FIG. 3 show the high-level basic diagram of the fax networking system with the invention and communication paths inserted

As shown in FIG. 2, the basic schematic demonstrating the connectivity of the Fax device (110), through an ATA device (125), directly connected to the Gateway (140) through a Firewall (135), connected to the IP network (150), connected to another Gateway (160), through a Firewall (165) connected directly to destination Fax Server (170), connected to a switched based network (PSTN) (180), connected to the receiving Fax device (190). This networking scheme is simplified for the most basic configuration understanding. The networking schemes of larger networks on either the transmitting and/or receiving sides of the figure may have multiples of other systems included and multiples of firewalls included, as well.

The flow of fax data through FIG. 2 is as follows: Transmitting Fax Device (110) send scanned data thru ATA device (125) which is streaming fax data to be packetize and routed through Firewall (135) through Gateway (140) to the IP Network (150) to Destination Gateway (160) and Firewall (165), to Fax Server (170) to depacketize data converting to analog/digital signals to be sent through switched based network (PSTN) (180), Receiving Fax Device (190) assembles all of the fax data transmitted. This is the simplistic view of a fax call from a local fax transmitting device through the IP Network and to a receiving fax device outside of the network.

Mode 1—"Live Time Faxing": The origination of the fax call requires a message to be sent through the connection of the Fax device (110), ATA device (125), IP network (150), Gateway (160), Firewall (165), Fax Server (170), switched based network (PSTN) (180), Fax device (190) and a reply message to acknowledge and confirm that the receiving Fax Device (190) is available to accept the call and to receive the fax data transmission. This all happens in what is referred to as "live time" faxing. After the message has been successfully transmitted through the network, the appropriate acceptance response message has been successfully transmitted back to the originating device, then the sending Fax device (110) and receiving Fax device (190) are ready to begin image processing of the transmissions. Once the image data has been completely transmitted from the sending Fax device (110) and verified received accurately on the receiving Fax device (190) then another message with status of the transaction is processed. The receiving Fax device (190) sends a transaction status message back thru the network to the sending Fax device (110) providing status check of either a successful or error receipt of the fax data transferred. Then both systems disconnect ("hang up") the fax call.

As shown in FIG. 2, the basic schematic demonstrating the connectivity of the Fax device (110), through an ATA device (125), directly connected to the Gateway (140) through a Firewall (135), connected to the IP network (150), connected to another Gateway (160), through a Firewall (165) connected directly to destination Fax Server (170), connected to a switched based network (PSTN) (180), connected to the receiving Fax device (190). This networking scheme is simplified for the most basic configuration understanding. The networking schemes of larger networks on either the transmitting and/or receiving sides of the figure may have multiples of other systems included and multiples of firewalls included, as well.

The flow of fax data through FIG. 2 is as follows: Transmitting Fax Device (110) send scanned data thru ATA device (125) which is streaming fax data to be packetize and routed through Firewall (135) through Gateway (140) to the IP Network (150) to Destination Gateway (160) and Firewall (165), to Fax Server (170) to depacketize data converting to analog/digital signals to be sent through switched based network (PSTN) (180), Receiving Fax Device (190) assembles all of the fax data transmitted. This is the simplistic view of a fax call from a local fax transmitting device through the IP Network and to a receiving fax device outside of the network.

The invention mechanism for synchronized processing of the fax data requires implemented components on both ATA device and the Fax Server. These components will be the controlling mechanism to the entire fax call and the processing of the fax data. The sequence of the call, messages, and data will be recorded, monitored and managed from the invention components enabled with this mode of operation. There will be a series of RTP/SIP message (also see FIG. 5) to be created and transmitted from the ATA device (125), though the Firewall (135) to IP network (150), Gateway (160), Firewall (165), Fax Server (170), switched based network (PSTN) (180), Fax device (190) where the reply RTP/SIP message will update the controlling components on both the ATA device and Fax Server. These messages are in full compliance to support T.30 fax devices and to manage the components between the ATA device (125) and Fax Server (170). This messaging and controlling or the communications will occur instantaneously and automatically from the point-to-point synchronizing algorithms written for the invention components implemented for both the ATA device (125) and Fax Server (170).

The component messaging will be handled with the highest of priority to retain full instantaneous synchronization between the ATA device (125), Fax server (170), without impact to the Receiving Fax Device (190), thus fully supporting synchronous mode of operation. The messages sent between implemented components will contain a set of base identifiers. The following set of fields will be stored in the Fax Server Timer Sequencer module: ATA Unique identifier, Fax Call Unique identifier, fax call progress, data call progress, fax server timing, ATA timing. The following set of fields will be stored in the ATA Timer Control module: Fax Server Unique identifier, ATA timing, fax server timing, fax call progress, data call progress. The ATA Timer Control module will be the controlling master to the fax call synchronization and all actions thereafter taken.

Mode 3—"Synchronized Faxing": The origination of the fax call requires a message to be sent through the connection of the Fax device (110), ATA device (125), IP network (150), Gateway (160), Firewall (165), Fax Server (170), switched based network (PSTN) (180), Fax device (190) and a reply message to acknowledge and confirm that the receiving Fax Device (190) is available to accept the call and to receive the fax data transmission. This all happens in what is referred to as "live time" faxing but is controlled, monitored and managed by the ATA Timer Control module in conjunction with the Fax Server Timer Sequencer module after the user has initiated the fax call. After the message has been successfully transmitted through the network, the appropriate acceptance response message has been successfully transmitted back to the originating device and registered in the ATA Timer Control module the sending Fax device (110) and receiving Fax device (190) are ready to begin image processing of the transmissions. The ATA Timer Control module will manage all communications events relevant to the successful processing of the fax call and fax data transmission. Once the image data has been completely transmitted from the sending Fax device (110) and verified received accurately on the receiving Fax device (190) then another message with status of the transaction is processed and recorded in the ATA Timer Control module and paired transaction message recorded on the Fax Server Timer Sequencer module. The receiving Fax device (190) sends a transaction status message back thru the network to the sending Fax device (110) providing status check of either a successful or error receipt of the fax data transferred. Then both systems disconnect ("hang up") the fax call. This is all in accordance with the management of the call by the ATA Timer Control module conf confirming the end of the call fax status.

Figure 3:
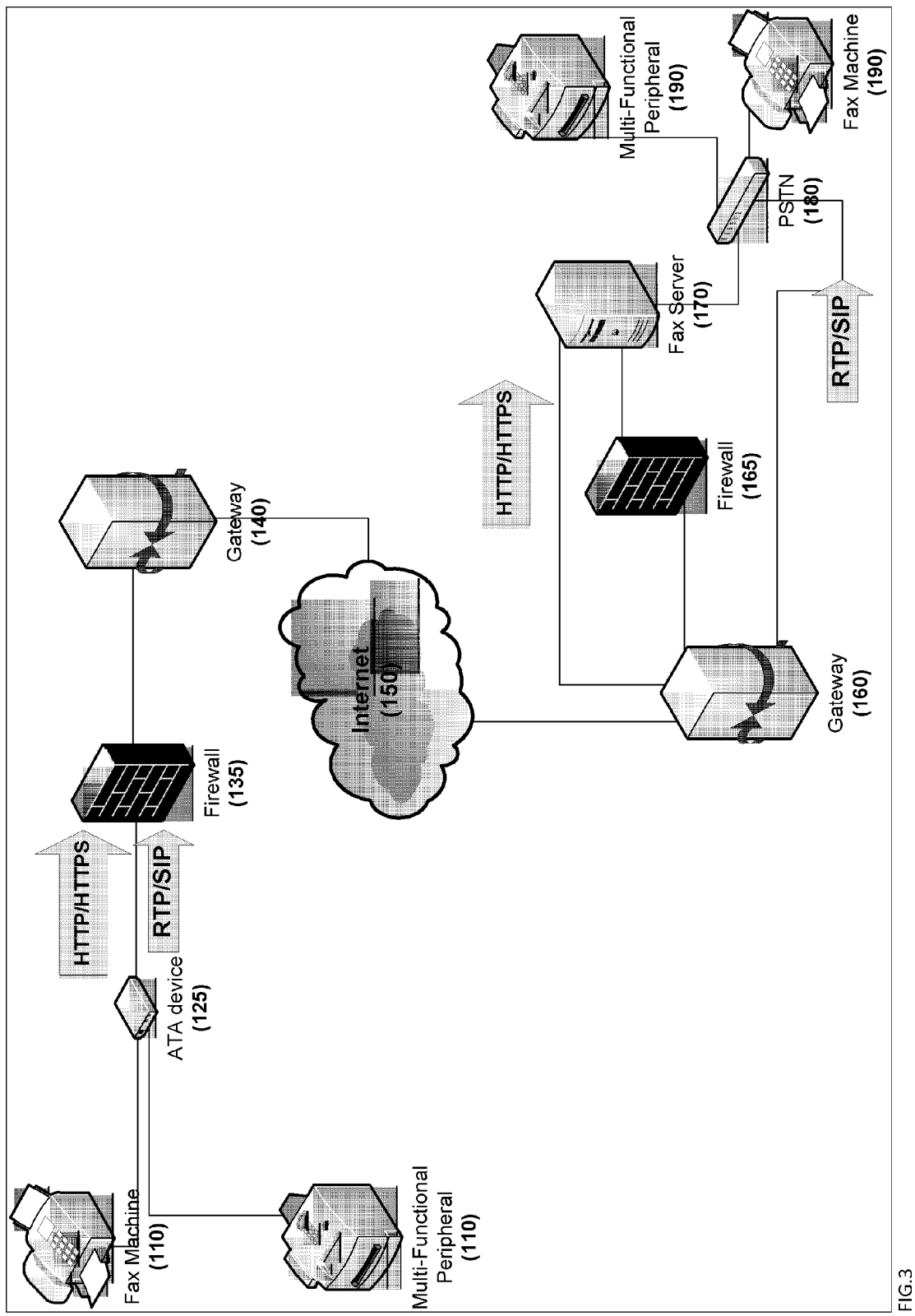
Figure 4:
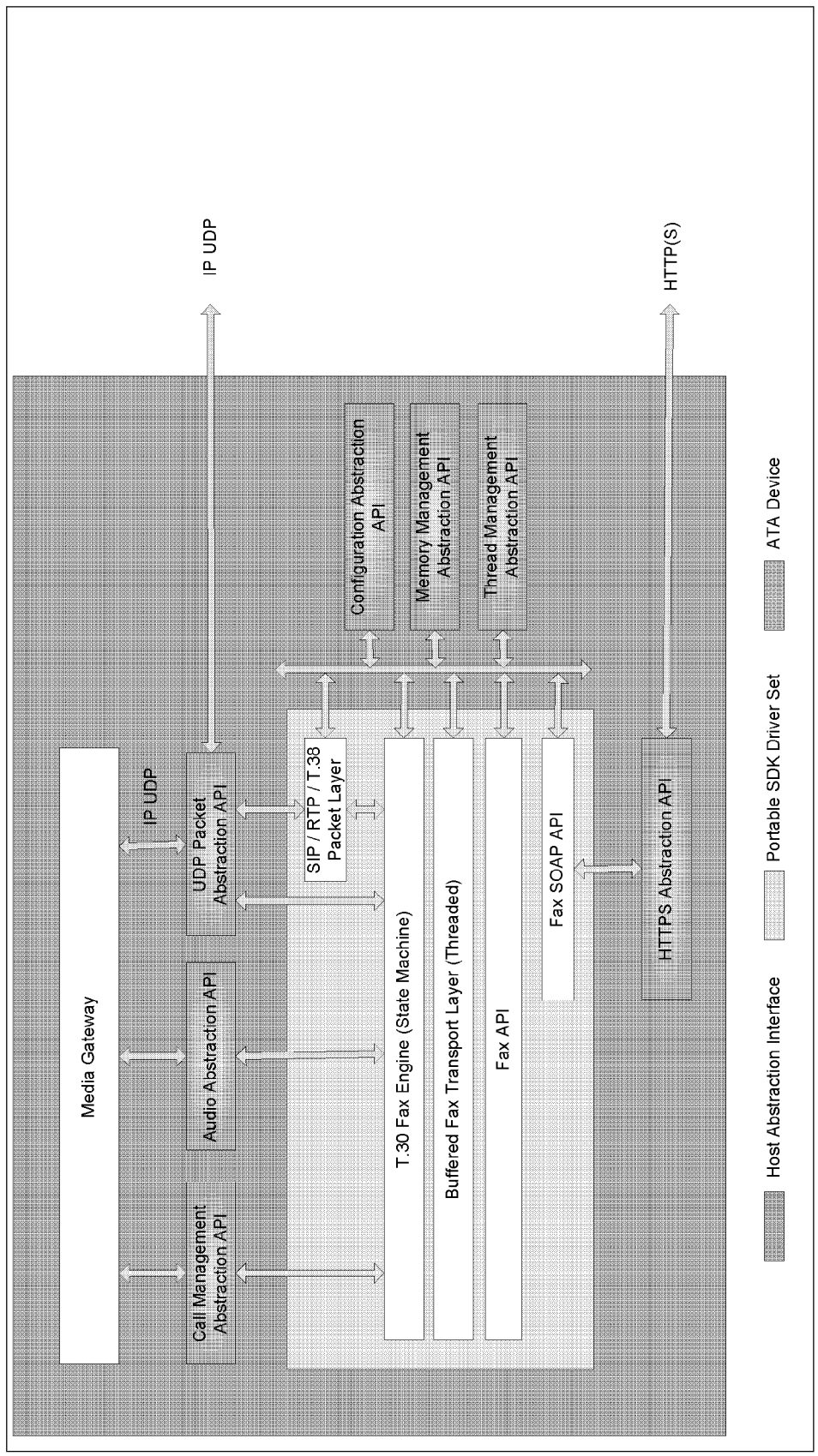
FIG. 4 shows the embedded ATA architecture residing in the ATA device
Figure 5:
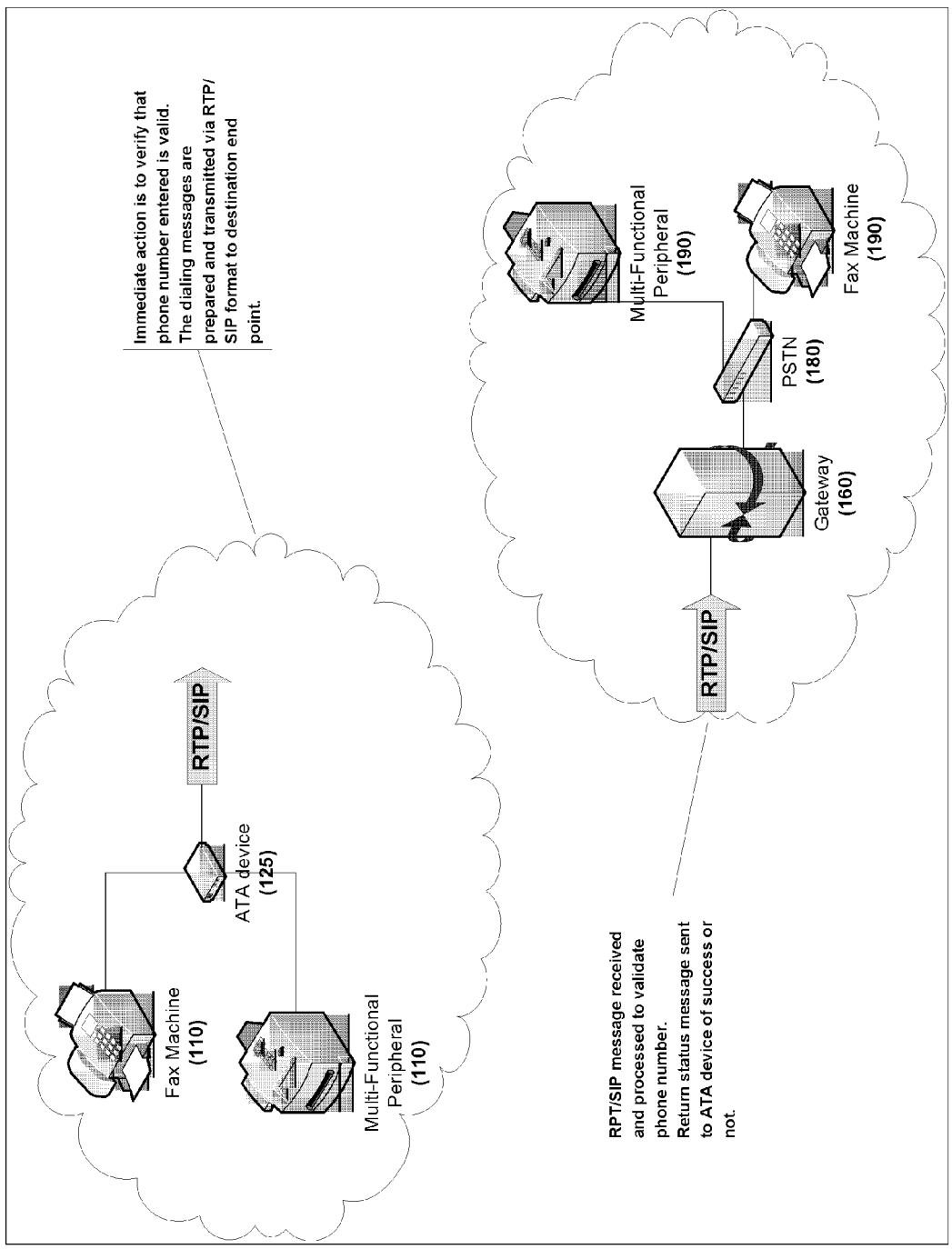
FIG. 5 shows the algorithm points for initiated RTP/SIP messages to validate phone number

As shown in FIG. 3, the basic schematic demonstrating the connectivity of the Fax device (110), through an ATA device (125), directly connected to the Gateway (140) through a Firewall (135), connected to the IP network (150), connected to another Gateway (160), through a Firewall (165) connected directly to destination Fax Server (170), connected to a switched based network (PSTN) (180), connect to the receiving Fax device (190). This is the same as FIG. 2 with the addition of the data paths included from the invention.

The invention process for the phone number validation requires an RTP/SIP dialing message (also see FIG. 5) to be created and transmitted from the ATA device (125), though the Firewall (135) to IP network (150), Gateway (160), Firewall (165), Fax Server (170), switched based network (PSTN) (180), Fax device (190) where the reply RTP/SIP message for confirming or not confirming a valid phone number will be received back through the path of Fax device (190), switch based network (PSTN) (180), Fax Server (170), Firewall (165), Gateway (160), IP Network (150), Firewall (135) to the ATA device (125). The reply message will determine if the HTTP/HTTPS data traffic has a valid phone number to be transmitted to from the Fax Server (170) to the Fax device (190) or not.

Mode 2—"Phone Number Validation Faxing": The origination of the fax call requires a message to be sent through the connection of the Fax device (110), ATA device (125), Firewall (135), Gateway (140), IP network (150), Gateway (160), Firewall (165), Fax Server (170), and a reply message to acknowledge and confirm that the receiving Fax Server (170) is available to accept the call and to receive the fax data transmission. Prior to the origination of the fax call the ATA device (125) will initiate a G.711/G.729 message to the receiving Gateway (160) to dial the phone number entered during the Fax device (110) fax call origination. The status of the dialed phone call is then transmitted back to the ATA device (125) to embed the phone number validation status of the call in the fax data stream that is about to start processing from the ATA device (125). This status message will be process appropriately on the ATA device (125). This is the validation of the phone number step that will guarantee that valid phone number(s) have been entered. This validation of the phone number implements the mechanism to support 911 calling requirements. A normal 911 call is possible at this point of the supposed fax call initiation. The 911 call would be kept active, whereas the phone number validation call instantaneously hang-up after receiving answer. The origination message for the fax call has been successfully transmitted through the network, and the appropriate acceptance response message has been successfully transmitted back to the originating device, then the sending Fax device (110) and receiving Fax Server (170) are ready to begin image processing of the fax transmission data. Once the image data has been completely transmitted from the sending Fax device (110) and verified received accurately on the receiving Fax Server (170) then another message with status of the transaction is transmitted. The receiving Fax Server (170) sends a transaction status message back thru the network to the sending Fax device (110) providing status check of either a successful or error receipt of the fax data transferred. Then both systems disconnect ("hang up") the fax call.

The fax data is ready for sending to the targeted fax receiving device. The receiving Fax Server (170) originates the fax call through the switched based network (PSTN) (180) to the receiving Fax device (190) and transmits the initial fax call message. Subsequent receipt of the reply message at the now originating Fax Server (170) acknowledges and confirms that the receiving Fax Device (190) is available to accept the call and to receive the fax data transmission during the fax call session by the transmitting Fax Server (170) through the switched based network (PSTN) (180) to the receiving Fax device (190). Once the image data has been completely transmitted from the sending Fax Server (170) and verified received accurately on the receiving Fax device (190) then another message with status of the transaction is processed. The receiving Fax device (190) sends a transaction status message back thru the switch based network (PSTN) (180) to the sending Fax Server (170) providing status check of either a successful or error receipt of the fax data transferred. Then both systems disconnect ("hang up") the fax call.

The Fax Server (170) contains all of the fax data transmitted, along with complete transaction data minimally including date, time, duration, and phone number.

What is claimed:

1. A method for establishing a fax connection link between a PSTN fax device and an ATA that allows for 911 calls, said method comprising:

establishing a fax connection link between a PSTN fax device, through an ATA a receiving fax gateway where the fax gateway is connected to the PSTN, further the fax connection link having Mode 2 phone number validation;

detecting if the entered phone number on the PSTN fax device is an emergency phone number;

if the entered phone number is an emergency phone number, then terminating Mode 2 phone number validation and then establishing a normal phone call.

2. The method of claim 1 wherein sad fax connection link further comprises:

terminating the fax connection link and establishing the normal phone call if the entered phone number is an emergency phone number.

\* \* \* \* \*